United States Patent [19]

Murakami

[11] 4,372,728

[45] Feb. 8, 1983

[54] TOOL TRANSFER ARM ASSEMBLY FOR AUTOMATIC MILLING MACHINES

[75] Inventor: Kunio Murakami, Hamamatsu, Japan

[73] Assignee: Enshu Limited, Japan

[21] Appl. No.: 222,255

[22] Filed: Jan. 2, 1981

[51] Int. Cl.³ .................. B23Q 3/157; B25J 9/00
[52] U.S. Cl. ........................ 414/590; 29/568; 414/744 A; 414/735
[58] Field of Search ............ 29/568; 414/735, 744 A, 414/590

[56] References Cited

U.S. PATENT DOCUMENTS

| | | | |
|---|---|---|---|
| 3,949,462 | 4/1976 | De Caussin | 29/568 |
| 3,975,817 | 8/1976 | Frazier | 29/568 |
| 3,999,664 | 12/1976 | Frazier | 29/568 X |
| 4,237,599 | 12/1980 | Buonauro et al. | 29/568 |

Primary Examiner—Z. R. Bilinsky
Attorney, Agent, or Firm—Lerner, David, Littenberg & Samuel

[57] ABSTRACT

A tool transfer assembly for automatic milling machines perform rapid but stable replacement of a tool on a spindle head under direct control by a cam groove formed in an axially turnable and vertically movable shaft operationally related to holding jaws for tool holders while effectively utilizing power derived from two pneumatic power sources, thereby avoiding dissipation of the power conventionally caused by dividing it during transmission.

6 Claims, 16 Drawing Figures

TOOL TRANSFER ARM ASSEMBLY FOR AUTOMATIC MILLING MACHINES

BACKGROUND OF THE PRESENT INVENTION

The present invention relates to a tool transfer arm assembly for automatic milling machines, and more particularly relates to a pneumatically operated tool transfer arm assembly for automatically replacing a tool on the spindle head of a milling machine with another tool placed at a stand-by position within the tool magazine of the machine following a prescribed programme.

In the case of a milling machine provided with a spindle head in which a tool is attached to the spindle head by holding the pull stud arranged at the tapered end of a tool holder by means of a collect arranged within a main spindle, the tool holder is reserved within a tool magazine simply by holding the above-described pull stud by means of an elastic gripper. For transfer of the tool from the tool magazine to the spindle head, it is only required for a tool transfer assembly to clamp a flange formed on the body of the tool holder by means of a pair of cooperating holder jaws and pull out the tool hold forcibly from the grip by the elastic gripper. When the tool holder is to be returned to the gripper, the tool holder is forcibly pushed into the gripper by the holder jaws.

In contrast to this, in the case of a milling machine provided with a spindle head in which a tool is attached to the spindle head by fastening a drawing bolt arranged within a main spindle, the tool holder is provided with no pull stud. Therefore, it is necessary to provide the tool magazine with any jaws or hooks for holding the flange of the tool holder. In addition, at transfer of the tool from the tool magazine to the transfer arm assembly, the flange of the tool holder has to be clamped by holder jaws of both elements. In order to enable such concurrent double clamping of the tool holder flange by the holder jaws at transfer of the tool, it is required to for a specially designed flange on the tool holder or to use a specially designed tool magazine of a complicated construction.

A solution to this problem is found in the invention of the U.S. Pat. No. 3,949,462, in which a tool magazine of a milling machine includes a horizontally arranged indexing table having a plurality of holes formed along its periphery at prescribed intervals in order to receive the tapered ends of tool holders therein in an inverted disposition. A transfer arm assembly of this invention includes a pair of holder jaws adapted for clamping and pulling a tool holder off the main spindle at the spindle head of the milling machine. After the clamping, the transfer arm assembly turns towards the indexing table in the tool magazine whilst turning the holder jaws over 180° in order to invert the tool holder upside down. Next, the transfer arm assembly moves downwards in order to insert the tapered end of the tool holder into one of the holes in the indexing table located at the stand-by position, and opens its holder jaws in order to release the tool holder taken from the spindle head. By subsequent rotation of the indexing table, a new tool holder is registered at the stand-by position in order to be caught by the holder jaws of the transfer arm assembly. Thereafter, the transfer arm assembly turns back towards the spindle head while carrying the new tool holder in order to attach it to the main spindle. After the attachment, the transfer arm assembly waits in the close proximity of the spindle head with its open holder jaws facing the main spindle.

With this construction, however, the driving force derived from a single pneumatic cylinder is divided into three components by a group of cams arranged in the power mechanism transmission, the first component being for the vertical movement of the transfer arm assembly, the second for the 180° turning of the assembly, and the third for 180° inversion of the holding jaws. Consequently, pressure angles between cooperating gears and slipping contact between cams and their associated cam followers have seriously malignant influences on the power transmission, thereby requiring unnecessarily large power consumption and causing greatly variating loads on the arms used for the power transmission. These disadvantages disables high speed operation of the transfer arm assembly and, consequently, reduction in transfer operation time.

SUMMARY OF THE INVENTION

It is the object of the present invention to enable high speed operation of the tool transfer arm assembly on a milling machine without even a little impairing perfect operation control over the entire process of the tool transfer.

It is another object of the present invention to smoothly carry out and combine the three major movements of the tool transfer arm assembly, i.e. the vertical movement of the assembly, the 180° turning of the assembly and the 180° inversion of the holding jaws during the turning.

It is the other object of the present invention to effect successful replacement of tools on a milling machine without causing any dissipation of power derived from given sources.

In accordance with the basic aspect of the present invention, arms in the power transmission mechanism are directly driven for operation by associated pneumatic cylinders, and means for adjusting the timing of operation is provided for the vertical movement, the 180° turning and the 180° inversion in order to effect full sequence control of these three major operations while delivering power from two separate sources.

DESCRIPTION OF THE PREFERRED EMBODIMENTS

Figure 1:
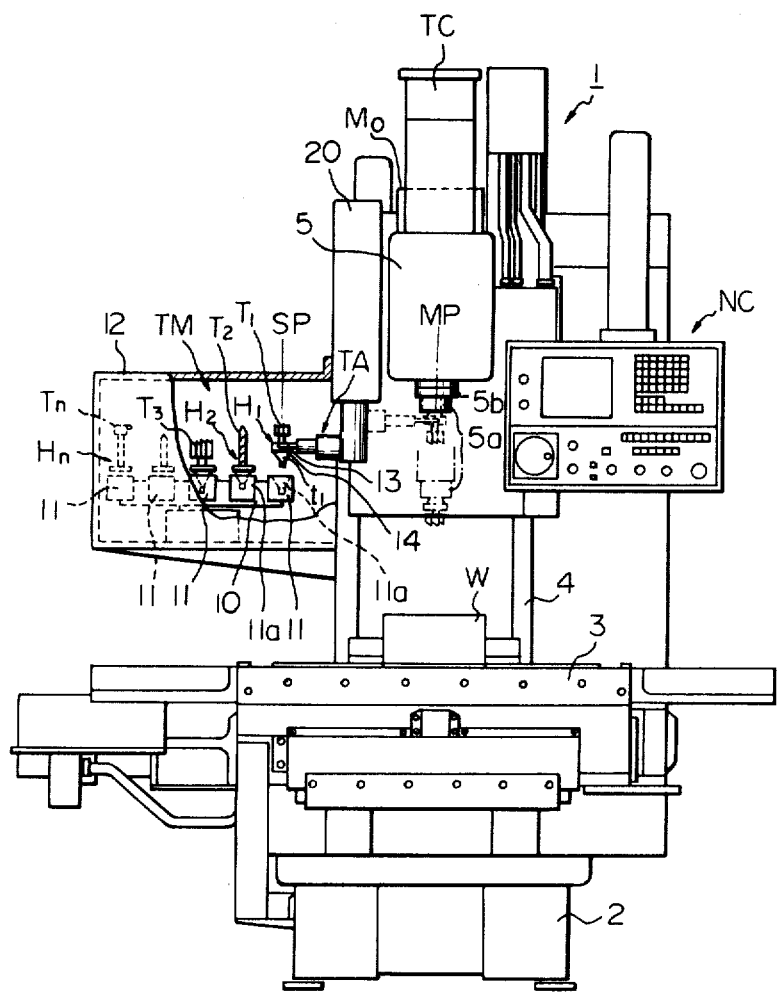
FIG. 1 is a front view of a vertical-type milling machine equipped with the tool transfer assembly in accordance with the present invention.

A vertical type milling machine equipped with the transfer arm assembly in accordance with the present invention is illustrated in FIG. 1, in which the machine 1 includes, as major parts, pedestal 2, a work table 3 mounted atop the pedestal 2, columns 4 standing upright from the work table 3, and a numerical controller NC supported by the columns 4 above the work table 3 in order to control the entire operations of the milling machine 1. A main spindle head 5 is also carried by the columns 4. A tool magazine TM for reserving tools is coupled to one side wall fixed to the columns 4 and an automatic tool transfer device provided with a tool transfer arm TA is arranged in front of the reservoir box TM.

The reservoir box TM is internally provided with a horizontally arranged, disc type indexing table 10 which carries, along its periphery, a plurality of separate sockets 11. Each socket 11 is provided with a vertical, conical recess 11a tapering downwards. As an alternative, these sockets 11a may be arranged along the outer face of an endless chain spanned between a pair of sprockets (not shown). The conical recesses 11a of the sockets 11 are receptive of tool holders $H_1$ to $H_n$ upside down which are adapted for holding tools $T_1$ to $T_n$ to be inserted therein from the upside. That is, mounting and dismounting of the tool holders $H_1$ and $H_n$ to and from the sockets 11 is practiced merely by inserting and drawing the tapered sections $t_1$ to $t_n$ of the inverted tool holders into and out of the conical recesses 11a. The above-described parts are all encased within a housing 12 attached sideways to the columns 4.

Figure 4:
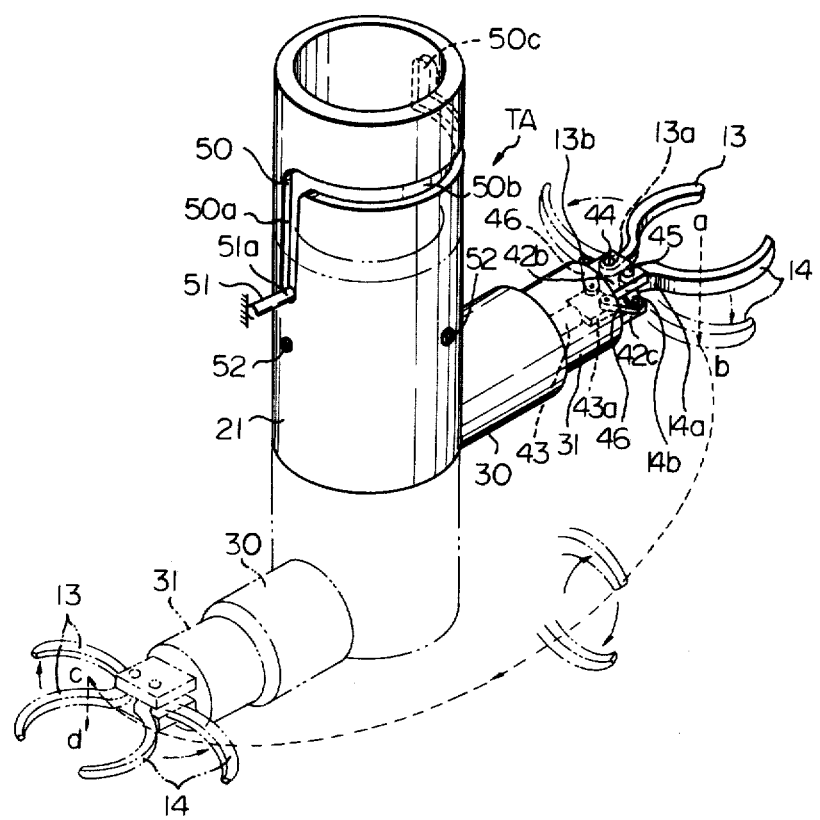
FIG. 4 is a perspective view of the tool transfer arm assembly shown in FIG. 3, FIGS. 5 through 13 are side views for showing the sequential operation of the tool transfer assembly shown in FIGS. 3 and 4, FIGS. 14 and 15 are side and plan views of another embodiment of the tool transfer arm assembly in accordance with the present invention in which the assembly stands by at a position somewhat distant from the spindle head during the milling operation.

The transfer arm assembly TA has a substantially L-shaped construction and is provided, at its free end, with a pair of movable holder jaws 13 and 14 (see FIG. 4). The transfer arm assembly TA is designed for four different movements. In the first movement, it shifts in a vertical direction. The second movement covers 180° turning between the positions of the main spindle 5a of the spindle head 5 and the tool magazine TM. In the third movement, the holder jaws 13 and 14 are driven for 180° turning for transfer of any tool holder H. As the fourth movement, the holder jaws 13 and 14 are opened and closed in order to control mounting and dismounting of the tool holder H.

By sequentially controlled combination of these four movements, the tool transfer arm assembly TA in accordance with the present invention picks up any tool holder, e.g. the tool holder Ha, placed in the stand-by position SP within the tool magazine TM, transfers the tool holder Ha to the milling position MP of the main spindle 5a of the spindle head 5 while turning same upside down, inserts the tool holder Ha into the main spindle 5a with locking, draws another tool holder, e.g. the tool holder Hb back to the tool magazine TM while the tool holder Hb back to the tool magagine TM whilst turning same upside down, and inserts the tool holder Hb into an associated conical recess 11a in the socket 11 in the indexing table 10.

Figure 2:
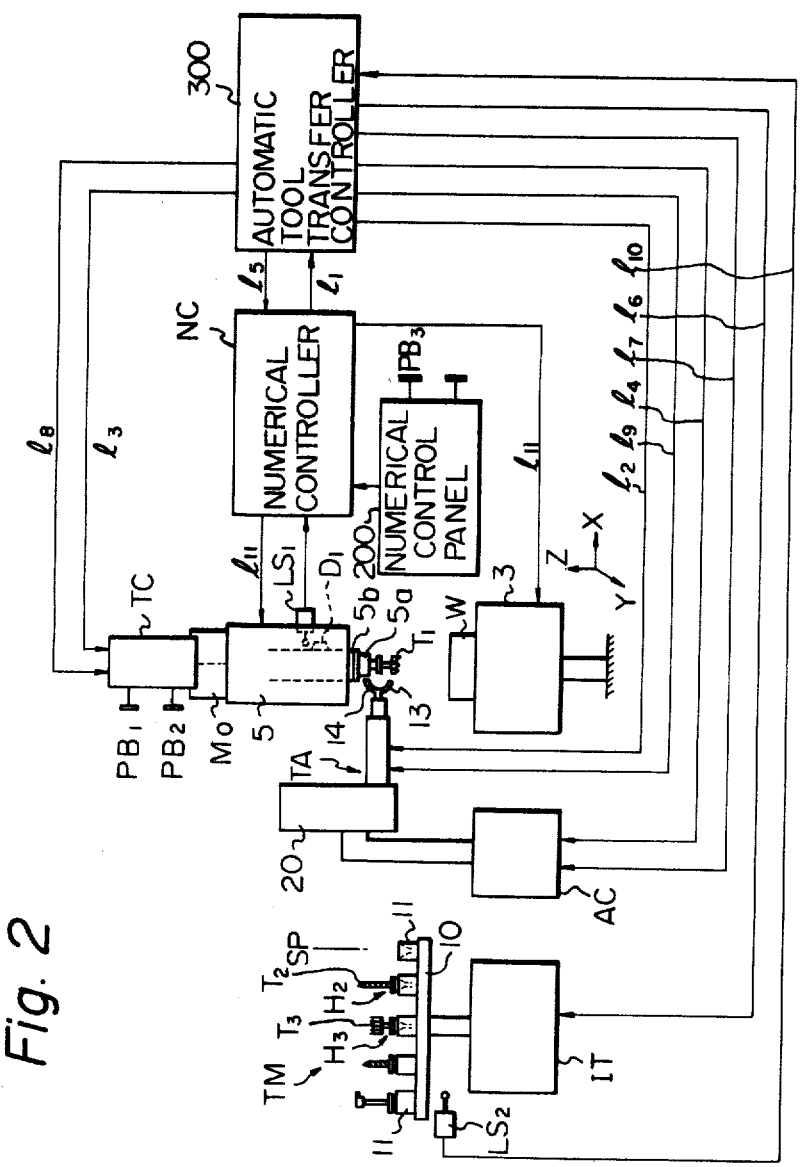
FIG. 2 is a circuit diagram of an electric control system for the milling machine shown in FIG. 1.

The construction of the electric control system for movements of the tool transfer arm assembly TM and the tool magazine TM is illustrated in FIG. 2. The above-described numerical controller NC forms the center of the electric control system and is accompanied with a numerical control panel 200 and an automatic tool transfer controller 300. The automatic tool transfer controller 300 is in turn connected to a indexing table controller IT and a transfer arm assembly controller AC. The automatic tool transfer controller 300 is further connected to a tool clamper assembly TC provided with clamping and releasing switches $PB_1$ and $PB_2$ to be manually operated.

The numerical controller NC is connected to a limit switch $LS_1$ with a dog $D_1$ on the spindle head 5 which detects lift of quill 5b for the main spindle 5a. Another limit switch $LS_2$ is arranged in the proximity of the tool magazine TM in order to detect whether or not the indexing table 10 rests in its home position. This limit switch $LS_2$ is connected to the automatic tool transfer controller 300. Lines $l_1$ to $l_{11}$ are used for connecting the above-described electric parts.

Operations of the above-described electric control system are briefly as follows.

Before starting of the operation, the main spindle 5a carrying a tool, e.g. the tool $T_1$, is located at a level suited for tool transfer as shown in the drawing. Under this condition, the first limit switch $LS_1$ is pressed, the transfer arm assembly TA is at its stand-by position facing the main spindle 5a with its holder jaws 13 and 14 being opened, and an empty socket 11 is at the stand-by position SP within the tool magazine TM.

As a starting switch $PB_3$ on the numerical control panel 200 is pressed under this condition, a main motor $M_o$ attached to the spindle head 5 is energized. Concurrently with this, signals are passed on to the lines $l_{11}$ from the numerical controller NC in order to lower the quill 5b of the spindle head 5 and lift the work table 3 carrying a work piece W thereon for milling operation. Three-dimensional movements of the main spindle 5a with respect to the work piece W are controlled as programmed in the numerical controller NC. As the milling operation is over, the main spindle 5a is dictated to lift and the dog $D_1$ again presses the first limit switch $LS_1$.

Thereupon, the drive motor $M_o$ ceases its rotation and the numerical collector reads a signal (m16: function) dictating that the tool $T_1$ should be transferred from the main spindle 5a to the tool magazine TM.

Next, the numerical controller NC passes over the above-described dictating signal to the automatic tool transfer controller 300 via the line $l_1$ so that the controller 300 dictates, via the line $l_2$, the transfer arm assembly TA to close its holder jaws 13 and 14 to hold the tool $T_1$ on the main spindle 5a. The tool transfer controller 300 concurrently passes over, via the line $l_3$, a dictating signal to the tool clamper assembly TC to release the tool $T_1$ on the main spindle 5a. As a consequence, a drawing bolt (not shown) in the main spindle is loosened for dismounting of the tool $T_1$ from the main spindle 5a.

When the above-described preparation is complete, the controller 300 gives a further dictating signal, via the line $l_4$, to the transfer arm assembly controller AC and the latter makes the assembly TA turn over 180° whilst inverting the tool holder $H_1$ with the tool $T_1$. As the free end is registered at the stand-by position SP within the tool magazine TM, the assembly TA inserts the tool $T_1$ into the socket 11 at that position and opens the holder jaws 13 and 14 in order to release the tool $T_1$. Thereupon, the controller 300 gives a dictating signal (m16: function), via the line $l_5$, to the numerical controller NC in order to stop its operation of the above-described content.

Next, the numerical controller NC passes over, via the line $l_1$, to the tool transfer controller 300 a dictating signal (m17: function) to make the socket 11 in the tool magazine TM advance over one station. The controller 300 then hands over, via the line $l_6$, this dictating signal m17 to the indexing table controller IT, which renders the indexing table 10 turn over one station so that another tool $T_2$ is brought to the stand-by position SP in the tool magazine TM. Concurrently with this procedure, the dictating signal m17 is passed over to the numerical controller NC via the line $l_5$.

The numerical controller NC further reads a dictating signal to transfer the new tool $T_2$ from the tool magazine TM to the main spindle 5a on the spindle head 5 and give it to the tool transfer controller 300. The controller 300 then passes over, via the line $l_7$, a dictating signal to the transfer arm assembly controller AC in order to close the holder jaws 13 and 14 for holding of the tool $T_2$. The transfer arm assembly TA pulls out the tool $T_2$ from the socket 11, turn over 180° while inverting the tool $T_2$ upside down, and transfers same to the position of the spindle head 5 in order to attach the new tool $T_2$ to the main spindle 5a.

Next, the tool transfer controller 300 gives a dictating signal, via the line $l_8$, to the tool clamper assembly TC to chuck the tool $T_2$, whereby the above-described drawing bolt in the main spindle 5a is tightened in order to fixedly mount the tool $T_2$ to the main spindle 5a.

After the mounting is complete, the controller 300 gives a dictating signal, via the line $l_9$, to the transfer arm assembly TA in order to open its holder jaws 13 and 14. A further dictating signal (m19: function) is passed over by the controller 300 to the numerical controller NC via the line $l_5$. Thereupon, the numerical controller NC controls movement of the main spindle 5a with respect to the work piece W in order to perform the next staged milling operation following a prescribed operation programmed. Different operation programmes are stored in the numerical controller NC for different tools.

Returning of the indexing table 10 to its original home position is initiated upon receipt of a dictating signal (m20: function) by the tool transfer controller 300 from the numerical controller NC via the line $l_1$. That is, when the dictating signal m20 is received, the controller 300 urges, via the line $l_6$, the indexing table controller IT to continuously turn the indexing table 10 back to the home position and the second limit switch $LS_2$ accompanying the tool magazine is pressed just before arrival of the socket 11 in the home position at the standing-by position SP. A signal generated by this closing of the limit switch $LS_2$ is passed over to the controller 300 via the line $l_{10}$, which thereupon generates a dictating signal to be passed over to the controller IT via the line $l_6$ in order to make the indexing table 10 stop at the next station. Thus, the socket 11 in the home position on the indexing table 10 is placed in the stand-by position SP in the tool magazine TM.

The construction of the tool transfer arm assembly TA in accordance with the present invention will now be explained in detail in reference to FIGS. 3 and 4.

The assembly TA includes a vertically elongated cylindrical housing 20 mounted to one of the columns 4 located about the middle of the space between the spindle head 5 and the tool magazine TM. An outer cylindrical shaft 21 is attached vertically to the lower end portion of the housing 20 by means of a bearing 20a in an axially turnable and vertically slidable arrangement.

An inner cylindrical shaft 22 is encased vertically within the housing 20 with its bottom flange 22a being secured, by means of set screws 23, to the top face of a flange 21a formed on the inside periphery of the outer cylindrical shaft 21. The upper portion of the inner cylindrical shaft 22 extends upwards beyond the upper end of the outer cylindrical shaft 21.

An annular groove 22b is formed in the outer face of the inner cylindrical shaft 22 at a position somewhat below the upper end of the outer cylindrical shaft 21 and the lower end of an L-shaped operating rod 24 is axially turnably received in the annular groove 22b. The upper end of this operating rod 24 is coupled to the end of a piston rod 25a of a pneumatic cylinder 25 arranged within the housing 20. As the piston rod 25a operates, the outer cylindrical shaft 21 is driven for corresponding vertical movement while keeping the axially turnable condition.

A pinion wheel 26 meshes with a spline 22c formed in the upper half outer face of the inner shaft 22 is provided with an annular groove 26a which is in rotatable engagement with one end of a holder 28 fixed to the inner wall of the housing 20 by means of a set screw 27. A pinion rack 29 coupled to a proper pneumatic cylinder (not shown) is arranged in meshing engagement with the pinion wheel 26. As the pinion wheel 26 is driven for rotation by reciprocation of the pinion rack 29, the outer cylinder 21 turns axially regardless of its vertical position due to the slidable engagement of the pinion wheel 26 with spline 22c on the inner shaft 22.

A holding cylinder 30 is horizontally attached to the bottom end portion of the outer shaft 21 and a supporting shaft 33 is coaxially coupled to the inner end 30a of the holding cylinder 30 by means of a bearing 32. This supporting shaft 33 has a thread 33a on its one end extending into the holding cylinder 30 and a cylindrical block 31 is partially inserted into the holding cylinder 30 with its inner end being screwed over the thread 33a on the supporting shaft 33 which is freely rotatable with respect to the holding cylinder 30. Inside the outer cylinder 21, a bevel gear 34 is fixed to the other end of the supporting shaft 33.

A vertical shaft 38 is rotatably held within the inner cylindrical shaft 22 by means of a pair of bearings 36 and 37 with its both ends being exposed outside. The upper exposed end of this shaft 38 is fixed to the operating rod 24 by means of a bracket 38a and a vertical connecting rod 39. A bevel gear 35 is fixed to the lower exposed end of the shaft 38 in meshing engagement with the bevel gear 34 on the supporting shaft 33.

Since the shaft 38 carrying the bevel gear 35 is coupled to the inner shaft 22 by means of the bearings 36 and 37, the bevel gear 35 fixedly held by the operating rod 24 remains standstill even when the inner shaft 22 is driven for rotation by movement of the pinion rack 29. Consequently, as the outer shaft 21 turns over 180°, the bevel gear 34 revolves about the stationary bevel gear 35 over 180° in order to turn the cylindrical block 31 over 180° about the axis of the shaft 38. During this turning, the cylindrical block 31 also turns axially over 180° due to the meshing engagement of the two bevel gears 34 and 35.

The cylindrical block 31 internally defines a piston chamber 40 accommodating a piston head 41. Outer end of the cylindrical block 31 is closed by a closure 42 screwed into the end in order to keep the piston chamber 40 air tight. A piston rod 43 extends from the piston head 41 through a center hole 42a axially formed in the closure 42 and is provided with a flat end 43a (see FIG. 4) which pivotally carries a pair of horizontally extending arms 46. The closure 42 is provided at its outer end with a pair of vertically spaced horizontal tongues 42b and 42c which carry a pair of juxtaposed vertical pins 44 and 45. The holder jaws 13 and 14 are pivotted at their ends 13a and 14a to the pins 44 and 45, respectively. The ends 13a and 14a are provided with outwardly curved extension 13b and 14b linked to the arms 46 on the piston rod 43. That is, the holder jaws 13 and 14 are articulately coupled to the piston rod 43.

Figure 3:
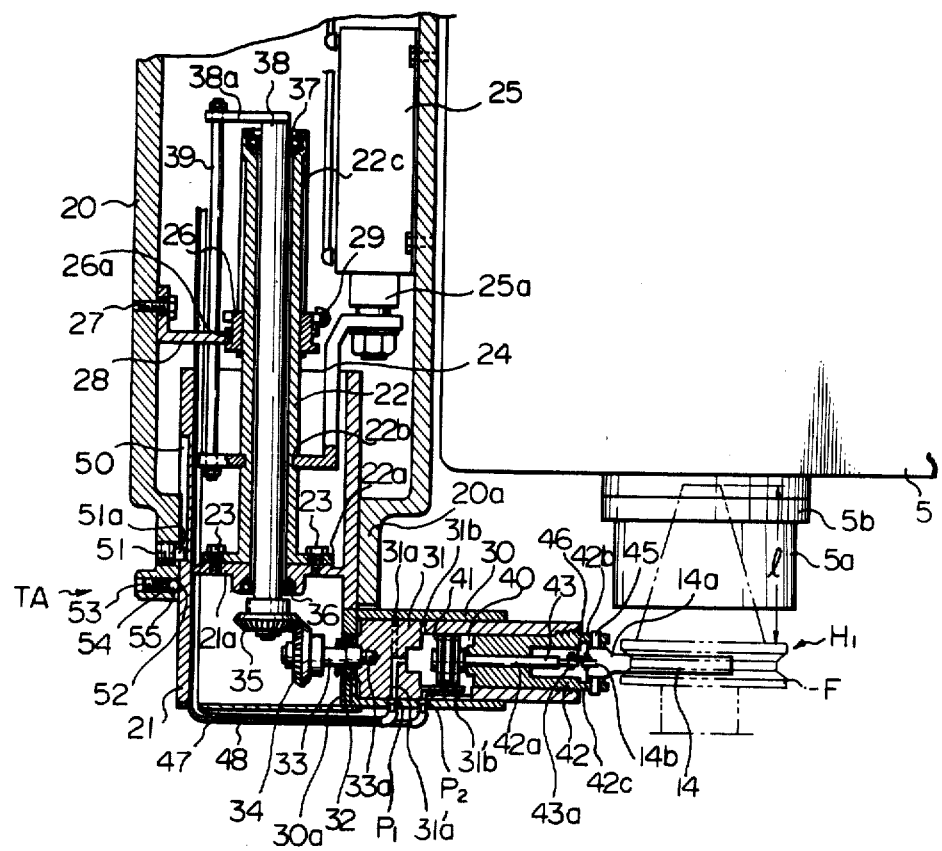
FIG. 3 is an enlarged vertical view of one embodiment of the tool transfer assembly in accordance with the present invention.

When the piston head 41 moves towards the end closure 42 in the piston chamber 40, the arms 46 on the piston rod 43 push the extensions 13b and 14b outwards and, consequently, the holder jaws 13 and 14 move towards each other in order to clamp the flange F of the tool holder $H_1$ as shown with chain lines in FIG. 3. Whereas, when the piston head 41 moves away from the end closure 42 in the piston chamber 40, the arms 46 on the piston rod 43 pull the extensions 13b and 14b inwards and, consequently, the holder jaws 13 and 14 move away from each other in order to release the flange F of the tool holder $H_1$ as shown with chain lines in FIG. 4.

The above-described reciprocation of the piston mechanism is effected by a pneumatic system which includes a pair of air pipes 47 and 48 connected to a proper pneumatic source. The air pipes 47 and 48 terminate in ports $P_1$ and $P_2$ formed in the holding cylinder 30 in communication with annular passages 31a and 31b formed in the periphery of the cylindrical block 31, respectively. The annular passage 31a communicates, via a further passage 31'a, with the section of the piston chamber 40 remote from the end closure 42 whereas the annular passage 31b communicates, via a further passage 31'b, with the section of the piston chamber 40 near the end closure 42. The sections are separated from each other by the piston head 41.

When compressed air is supplied into the piston chamber 40 via the air pipe 47 and the port $P_1$, the piston head 41 moves towards the end closure 42 in order to close the holder jaws 13 and 14 as shown with solid lines in FIG. 4. Whereas, when compressed air is supplied into the piston chamber 40 via the air pipe 48 and the port $P_2$, the piston head 41 shifts away from the end closure 42 in order to open the holder jaws 13 and 14 as shown with chain lines in FIG. 4. Supply of the compressed air into the piston chamber 40 via the ports $P_1$ and $P_2$ is not interrupted at all by the axial turning of the cylindrical block 31 within the holding cylinder 30 since they open in the annular passages 31a and 31b formed in the periphery of the block 31.

The radial length of the holder jaws 13 and 14 from the axis of the outer cylindrical shaft 21 is designed so that the holder jaws 13 and 14 are able to clamp by closing and release by opening the tool holder $H_1$ held by the socket 11 in the stand-by position SP and held by the main spindle 5a in the milling position MP.

Next a cam groove 50 is formed in the outer periphery of the outer cylindrical shaft 21 in combination with a pin 51 screwed into the wall of the housing 20 in order to control timing of the vertical movement, 180° turning movement and holder jaws inverting movement of the tool transfer arm assembly TA in accordance with the present invention. The pin 51 projects radially inwards with its point 51a being in engagement with the cam groove 50 in the outer shaft 21. The cam groove 50 consists of a horizontal section 50b, a lower vertical section 50a extending downwards from the one end of the horizontal section 50b, and an upper vertical section 50c extending upwards from the other end of the horizontal section 50b. The cam groove 50 controls movements of the outer shaft 21 as the latter is driven for movement by the operating cylinder 24 coupled to the pneumatic cylinder 25 and the pinion rack 29 coupled to the given pneumatic power source (not shown), respectively.

With the above-described construction of the cam groove 50 formed in the outer shaft 21, when the pin 51 is in engagement with the bottom end of the lower vertical section 50a, the transfer arm assembly TA is located at the highest level on the side of the main spindle 5a at the milling position MP with its holder jaws 13 and 14 facing a tool holder H so that closing of the jaws 13 and 14 clamps the flange F of the holder H on the main spindle 5a.

As the pneumatic cylinder 25 operates to lower the outer shaft 21 via the operating rod 24 and the inner shaft 22, the pin 51 lifts along the lower vertical section 50a of the cam groove 50 so that the transfer arm assembly TA lowers over the distance equal to the length of the lower vertical section 51a which is somewhat larger than that of the tapering section of the holder H (see FIG. 3). By this movement of the transfer arm assembly TA, the tool holder H is removed from the main spindle 5a of the spindle head 5.

As the pin 51 is registered at the top end of the lower vertical section 50a of the cam groove 50, the pneumatic power source for the pinion rack 29 starts its operation to turn the outer shaft 21 via the inner shaft 22 over 180° in the clockwise direction in FIG. 4. Consequently, the cylindrical block 31 performs similar turning while inverting the holder jaws 13 and 14 over 180° due to the meshing engagement between the bevel gears 34 and 35. During this turning, the pin 51 travels along the horizontal section 51b from the top end of the lower vertical section 51a to the bottom end of the upper vertical section 51c. Concurrently, the transfer arm assembly TA turns from the milling position MP to the stand-by position SP in the tool magazine TM as shown with chain lines in FIG. 4.

As the pin 51 is registered at the bottom end of the vertical section 50c in the cam groove 50, the pneumatic cylinder 25 operates again in order to further lower the outer cylinder 21 and the pin 51 lifts in the upper vertical section 50c of the cam groove 50. Whereby the transfer arm assembly TA in the stand-by position ST lowers over a distance equal to the length of the upper vertical section 50c in order to register the tool holder H at a socket 11 on the indexing table 10. Next, the holding jaw 13 and 14 open to release the tool holder H which thereupon falls into the conical recess 11a in the socket 11 by its own weight.

When the pneumatic power sources for the operating rod 24 and the pinion rack 29 operate reversely, the above-described operation and movement of the transfer arm assembly TA is reversed in order, the pin 51 travelling along the cam groove 50 reversely.

During the process, the transfer arm assembly TA stops its movement at its highest level at the milling position MP (see FIG. 3) whilst facing the main spindle 5a. At this moment, the pin 51 is located at the bottom end of the lower vertical section 50a of the cam groove 50. Any unexpected leakage of the pressured air in the pneumatic cylinder 25 allows free lifting of the pin 51 in the lower vertical section 50a of the cam groove 50, thereby causing abrupt falling of the transfer arm assembly TA at the milling position MP. In order to prevent such an uncontrolled movement of the transfer arm assembly TA, at least one spot recess 52 is formed in the outer face of the outer shaft 21 as shown in FIG. 3. For each recess 52, a radial hole is formed through the housing 20 and a locking ball 55 is inserted into the radial hall. This locking ball 55 is elastically pressed to engage with the recess 52 in the outer shaft 21 by means of a screw 53 screwed into the radial hole and a compression spring 54 interposed in between the screw 53 and the locking ball 55. In order to keep the correct centering of the outer shaft 21, a plurality of spot recesses 52 should preferably be uniformly allotted along its periphery with associated locking balls 55 in the housing 20. With the above-described construction, the tool transfer arm assembly TA in accordance with the present invention operates as follows, reference being made to FIGS. 5 to 13.

During the milling operation of the machine, the main spindle 5a carrying a tool holder $H_1$ is located at a closer level to the work table 3 as shown with chain lines in FIG. 1 for milling the work piece W on the work table 3.

Figure 5:
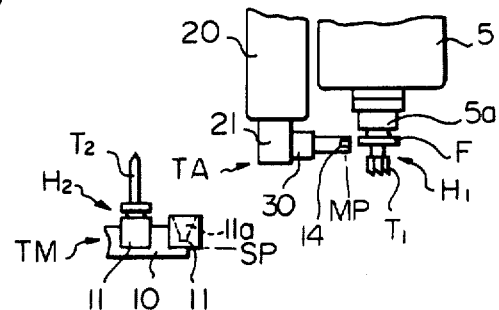

As the dictating signal for transfer of the tool is generated, the main spindle 5a lifts to a position whereat the tool holder $H_1$ faces the open holder jaws 13 and 14 of the transfer arm assembly TA in the milling position MP as shown in FIG. 5. Under this condition, the section of the piston chamber 40 in communication with the port $P_2$ is replete with compressed air, the pneumatic cylinder 25 is energized to keep the outer cylinder 21 at its highest level, and an empty socket 11 is located at the stand-by position SP within the tool magazine TM.

Next supply of the compressed air into the piston chamber 40 is shifted from the section connected to the port $P_2$ to the section connected the port $P_1$. Then the piston head 41 moves towards the end closure 42 and the holding jaws 13 and 14 close to hold the flange F of the tool holder $H_1$ held by the major spindle 5a as shown in FIG. 3. Just after this closing, the drawing bolt (not shown) within the main spindle 5a is driven for rotation to release the tool holder $H_1$, and the pneumatic cylinder 25 for the operating rod 24 and the pneumatic power source for the pinion rack 29 both operate reversely.

Figure 6:
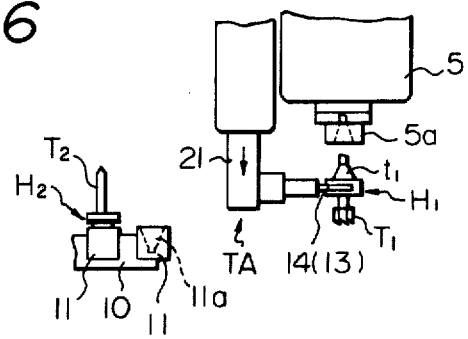

As a consequence, the outer shaft 21 is allowed to lower over the distance equal to the length of the lower vertical section 50a of the cam groove 50 with which the pin 51 engages. Then, the transfer arm assembly TA coupled to the outer shaft 21 as shown in FIG. 3 moves downwards in order to detach the tool holder H from the main spindle 5a on the spindle head 5 as shown in FIG. 6. At this moment, the pin 51 is located at the junction between the lower vertical and horizontal sections 50a, 50b, of the cam groove 50, the pneumatic cylinder 25 stops its operation, and the pinion rack 29 is able to advance.

Figure 7:
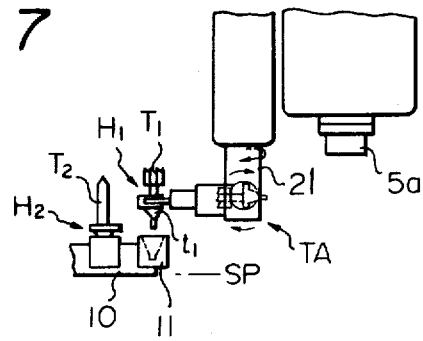

As the pinion rack 29 advances, the transfer arm assembly TA is driven for 180° turning in the clockwise direction untill the pin 51 in the cam groove 50 comes to the pin 51 in the cam groove 50 comes to the lower end of the upper vertical section 50c whilst causing 180° inversion of the tool holder $H_1$ via the cylindrical block 31 in order to bring the tapered section $t_1$ of the tool holder $H_1$ right above the empty socket 11 standing by as shown in FIG. 7. At this moment, the pin 51 is registered at the lower end of the upper vertical section 50c in order to allow vertical movement of the outer shaft 21.

Figure 8:
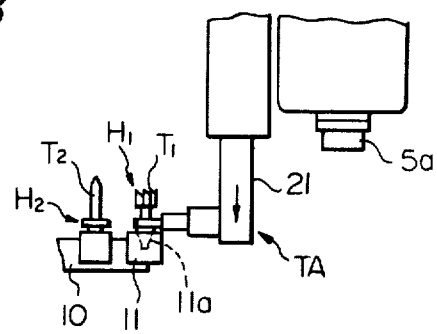

As the pneumatic cylinder 25 operates again to lower the outer shaft 21, the transfer arm assembly TA moves towards indexing table 10 in order to insert the tapered section $t_1$ of the tool holder $H_1$ clamped by the holder jaws 13 and 14 into the conical recess 11a in the socket as shown in FIG. 8. Then, compressed air is supplied into the piston chamber 40 via the second port $S_2$ so that the piston head 41 should move away from the end closure 42. By the accompanying recession of the piston rod 43, the holder jaws 13 and 14 open to release the tool holder $H_1$ which then falls into the conical recess 11a of the socket 11 due to its own weight.

Figure 9:
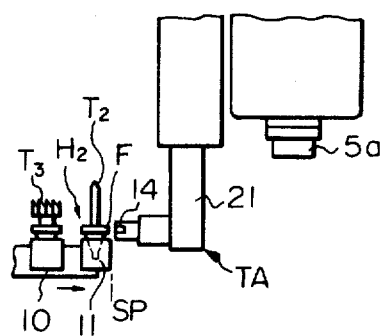

Next, the indexing table 10 within the tool magazine TM rotates axially and a tool holder $H_2$ of the tool $T_2$ to be used next is brought to the stand-by position SP as shown in FIG. 9. Under this condition, the tool holder $H_2$ faces the open holder jaws 13 and 14 of the transfer arm assembly TA in the stand-by position SP. After this registration of the new tool holder $H_2$ is complete, supply of compressed air to the piston chamber 40 is shifted so that the compressed air is now fed via the first port $P_1$, thereby the holder jaws 13 and 14 being closed to firmly clamp the new tool holder $H_2$.

Operations of the pneumatic cylinder 25 and the pneumatic power source for the pinion rack 29 are now reversed in order to cause reversed movements of the transfer arm assembly TA.

Figure 10:
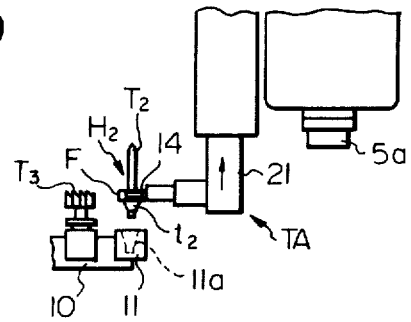
Figure 11:
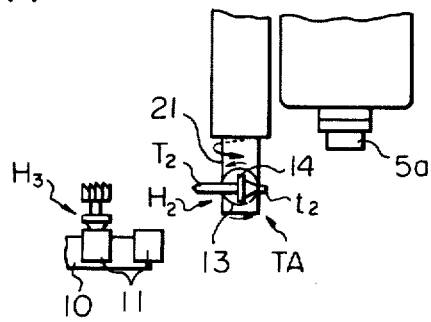
Figure 12:
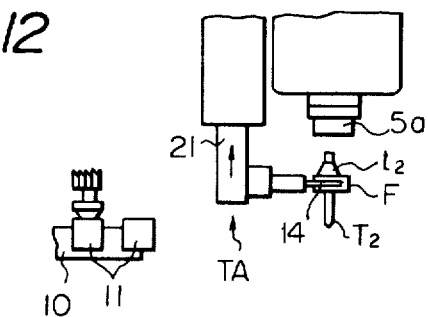

That is, as shown in FIG. 10, the outer shaft 21 is driven for upward movement in order to pull out the tool holder $H_2$ upwards from the socket 11 on the indexing table 10. Next, as shown in FIG. 11, the pinion rack 29 recedes in order to turn the outer shaft 21 over 180° so that the transfer arm assembly TA travels to the milling position MP right under the main spindle 5a while inverting the tool holder $H_2$ upside down due to the meshing engagement between the bevel gears 34 and 35. This condition is illustrated in FIG. 12. Then, the pneumatic cylinder 25 operates to move the outer shaft 21 upwards and the pin 51 approaches the lower end of the lower vertical section 50a of the cam groove 50. Accompanying ascent of the transfer arm assembly TA makes the tool holder $H_2$ insert its tapered section $t_2$ into the main spindle 5a. As this insertion is detected, the drawing bolt (not shown) in the main spindle 5a is fastened to firm attach the tool holder $H_2$ to the main spindle 5a.

Figure 13:
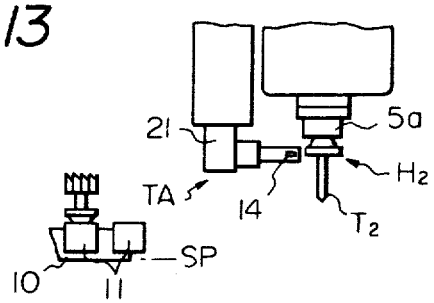

Now the compressed air is supplied into the piston chamber 40 via the second port $P_2$ in order to recede the piston rod 43 and open the holder jaws 13 and 14, thereby releasing the tool holder $H_2$ as shown in FIG. 13. Now replacement of the tool holder H on the main spindle 5a is completed. Under this condition, the transfer arm assembly TA stands still with its open holder jaws 13 and 14 facing the main spindle 5a which then moves towards the work table 3 for applying programmed milling operation to the work piece W placed on the work table 3.

Figure 14:
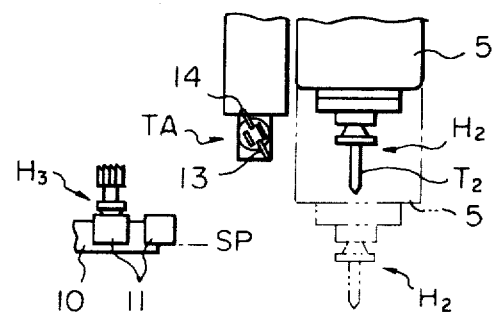
Figure 15:
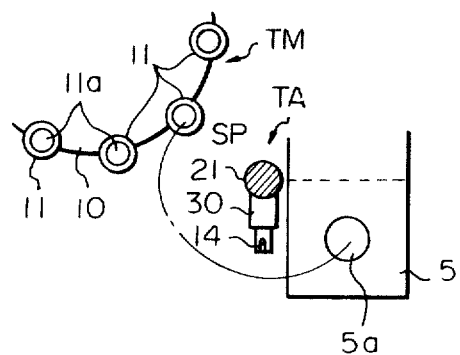
Figure 16:
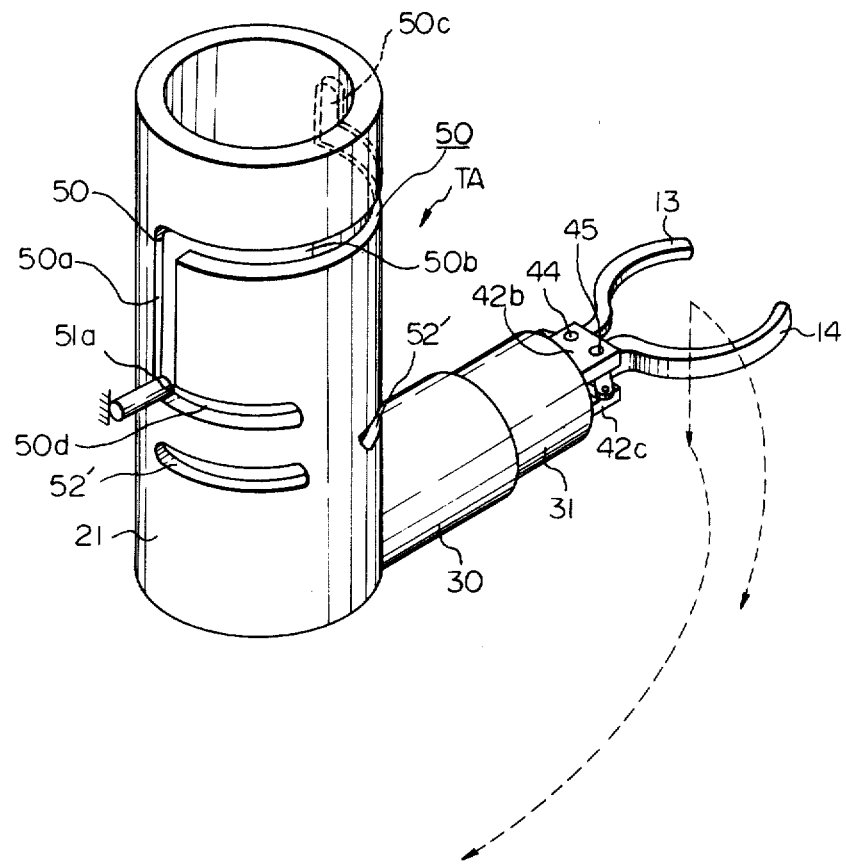
FIG. 16 is a perspective view of the tool transfer arm assembly shown in FIGS. 14 and 15.

In the case of the above-described embodiment wherein only the main spindle 5a moves vertically for milling operation, the transfer arm assembly TA is allowed to stand by in the close proximity of the spindle head 5 during the milling operation. In the case of the embodiment shown in FIG. 14, however, wherein the spindle head 5 itself moves vertically for milling operation, the transfer arm assembly TA is required to wait at a position outside the moving ambit of the spindle head 5 (see FIG. 15 also).

In this case, the transfer arm assembly TA has to turn about 45° in the clockwise direction in order to be brought to the waiting position. In order to meet this requirement, the cam groove 50 further includes a lower additional horizontal section 50d which extends over 45° center angle. This additional horizontal section 50d runs in parallel to the main horizontal section 50b from the lower end of the lower vertical section 50a. Further, a pair of grooves 52' are formed in the outer face of the outer shaft 21 in spaced alignment with each other and in parallel to the additional horizontal section 50d of the cam groove 50. Presence of the additional horizontal section 50d allows the abovedescribed additional 45° turning of the transfer arm assembly TA. Here, the grooves 52' corresponds to the spot recesses 52 in the embodiment shown in FIG. 4.

It should be noted in connection with this embodiment that any downward movement of the outer shaft 21 is blocked as long as the pin 51 is in engagement with the additional horizontal section 50d of the cam groove 50. In other words, accidental leakage of the compressed air in the pneumatic cylinder 25 does not cause any falling of the outer cylinder 21 as long as the pin 51 is kept in such an engagement. Consequently, the grooves 52', the locking ball 55 and their related parts may be safely omitted in the case of this embodiment.

Further, in the case of the foregoing embodiments, the transfer arm assembly TM turns over 180° for transfer of the tool between the stand-by and milling position SP, MP. When the turning angle of the transfer assembly TM should be smaller than 180°, the gear ratio between the bevel gear 34 and 35 should accordingly be adjusted so that whole turning of the transfer arm assembly TA should cause 180° inversion of its holding jaws 13 and 14.

The present invention is further applicable to an arrangement wherein the tool holder is provided with a pull stad at its tapered end.

In accordance with the present invention, sequential operations and movements of the transfer arm assembly TA and its holder jaws 13 and 14 are reversibly, directly and automatically controlled by programmed operations of the two power sources, thereby effectively utilizing pneumatic energy provided by these power sources. Further, tactfully designed combination of the parts enables exactly sequential, high speed performance including turning and vertical movements of the assembly, and inversion and closing of the holding jaws whilst using the two major pneumatic power sources.

I claim:

1. A tool transfer arm assembly for automatic milling machines comprising a fixed, vertically elongated, cylindrical housing having a bottom opening, a cylindrical first shaft vertically slidably and axially turnably inserted into said housing through said bottom opening, a cylindrical second shaft vertically and coaxially fixed within said first shaft, an operating rod coupled, at its one end, to a first pneumatic cylinder fixed to said housing and, at its the other end, to the outer surface of said second shaft whilst allowing free axial turning of said second shaft so that operation of said first pneumatic cylinder causes corresponding vertical movement of said first and second shafts, a pinion wheel coupled to a vertical spline formed in the outer surface of said second shaft whilst allowing free vertical movement of said second shaft, a pinion rack operationally coupled to a second pneumatic cylinder and placed in meshing engagement with said pinion wheel so that operation of said second pneumatic cylinder causes axial turning of said second shaft without any interference by its vertical movement, a vertically extending third shaft inserted into said second shaft by means of bearings, fixedly linked to said operating rod, and provided with a first bevel gear fixed to its bottom end, a holding cylinder horizontally, radially and outwardly extending from said bottom opening of said housing, a cylindrical block axially turnably inserted into said holding cylinder and fixedly carrying at its inner end a second bevel gear in meshing engagement with said first bevel gear carried by said third shaft, an end closured fixed to the outer end of said cylindrical block so that a piston chamber is formed within said cylindrical block, both stroke ends of said piston chamber being connected to separate supply lines of compressed air, a piston head encased within said piston chamber and accompanied with an outwardly extending piston rod through said end closure, a pair of cooperating holding jaws operationally linked to the outer end of said piston rod so that axial reciprocation of said piston head causes corresponding opening and closing of said holding jaws, and a pin fixed to said housing in sliding engagement with a cam groove formed in the outer surface of said first shaft, said cam groove including a vertically extending first section which controls a first vertical movement of said assembly for moving a tool holder towards and away from a spindle head in a milling position, a second section horizontally extending at its one end from the upper end of said first section which controls axial turning of said assembly for transferring said tool holder between milling and stand-by positions, and a third section vertically extending upwards from the other end of said second section which controls a second vertical movement of said assembly for moving said tool holder towards and away from a socket in said stand-by position.

2. A tool transfer arm assembly as claimed in claim 1 in which said piston chamber is connected to a first supply line of compressed air via a first passage opening in one stroke end of said piston chamber and terminating in a first annular groove formed in the outer surface of said cylindrical block and a first port formed in said holding cylinder, and to a second supply line of compressed air via a second passage opening in the other stroke end of said piston chamber and terminating in a second annular groove formed in the outer surface of said cylindrical block and a second port formed in said holding cylinder.

3. A tool transfer arm assembly as claimed in claim 1 in which each said holding jaws is linked to said piston rod by means of an arm pivotted at one end to said outer end of said piston rod and at the other end to an outwardly curved tail of said holding jaw.

4. A tool transfer arm assembly as claimed in claim 1 further comprising
a locking ball arranged within said housing and elastically pressed towards the center axis of said first shaft so that it can be received in one of a pair of spot recesses when said assembly is registered at either end of said turning.

5. A tool transfer arm assembly as claimed in claim 1 in which
said second section of said cam groove extends over 180° center angle.

6. A tool transfer arm assembly as claimed in claim 1 in which
said second section of said cam groove extends over an angle smaller than 180° by an angle $\theta$, and
said cam groove further includes a fourth section extending horizontally from the lower end of said first section in the direction of said second horizontal section over $\theta$ center angle.

* * * * *